United States Patent
Kusase

(10) Patent No.: US 6,840,045 B2
(45) Date of Patent: Jan. 11, 2005

(54) COMPOUND ENGINE DYNAMO-ELECTRIC MACHINE

(75) Inventor: Shin Kusase, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/355,299

(22) Filed: Jan. 31, 2003

(65) Prior Publication Data

US 2003/0145597 A1 Aug. 7, 2003

(30) Foreign Application Priority Data

Feb. 6, 2002 (JP) ........................................ 2002-029446
Jun. 13, 2002 (JP) ........................................ 2002-172787

(51) Int. Cl.$^7$ ............................................. F01B 21/04
(52) U.S. Cl. ............................. 60/702; 60/711; 60/719
(58) Field of Search ........................... 60/702, 711, 719

(56) References Cited

U.S. PATENT DOCUMENTS

| | | | | |
|---|---|---|---|---|
| 3,785,147 A | * | 1/1974 | Leeson, Jr. ................... | 60/702 |
| 3,812,377 A | * | 5/1974 | Malone ....................... | 290/4 R |
| 4,137,721 A | * | 2/1979 | Glennon et al. ............... | 60/711 |
| 4,147,035 A | * | 4/1979 | Moore et al. .................. | 60/711 |
| 4,412,422 A | * | 11/1983 | Rossi ........................... | 60/706 |
| 4,771,606 A | * | 9/1988 | Mose et al. .................... | 60/711 |
| 4,926,628 A | * | 5/1990 | Veerhusen et al. ......... | 60/39.15 |
| 6,129,075 A | * | 10/2000 | Murata et al. ......... | 123/568.21 |
| 6,593,713 B2 | * | 7/2003 | Morimoto et al. .......... | 318/139 |

* cited by examiner

Primary Examiner—Hoang Nguyen
(74) Attorney, Agent, or Firm—Oliff & Berridge, PLC

(57) ABSTRACT

A first exhaust turbo rotary machine is able to assist turbo supercharging by operating as a motor on power generated in a second rotary machine connected to a power axis of an engine. Also, when exhaust energy is large, the first turbo rotary machine operates as a generator so as to make the second rotary machine connected to the engine motive power axis operate electrically, thereby making it possible to add exhaust energy to the engine motive power axis. Consequently, that which results is a compound engine dynamo-electric machine that improves total efficiency of the engine by adding exhaust energy, which is otherwise discarded, to the engine motive power axis. This arrangement increases engine torque in a speed region where exhaust pressure is low by utilizing part of the engine's motive power as a supercharging driving force.

23 Claims, 5 Drawing Sheets

COMPOUND ENGINE DYNAMO-ELECTRIC MACHINE

CROSS REFERENCE TO RELATED APPLICATIONS

This application is based upon, claims the benefit of priority of, and incorporates by reference, the contents of Japanese Patent application No. 2002-29446 filed Feb. 6, 2002, and No. 2002-172787 filed Jun. 13, 2002.

BACKGROUND OF THE INVENTION

1. Field of the Invention

The present invention relates to improving total fuel consumption and engine output torque of a compound system composed of an engine and a rotary machine. More particularly, the invention relates to a dynamo-electric machine or a turbo dynamo-electric machine attached to an engine that is operated in concert with another dynamo-electric machine. Finally, the invention relates to a vehicle engine usable within a broad spectrum of engine speeds and to a system of rotary machines attached thereto.

2. Description of the Related Art

Generally, many techniques have been proposed in order to improve fuel consumption and torque of engines. An example of an electrical method is generating large amounts of driving energy at high engine speeds with a rotary machine attached to the engine in order to accumulate a form of the energy. The stored energy is used to contribute or increase total generated torque in a low speed region where the engine torque may be insufficient. This is accomplished by making the rotary machine operate electrically with the accumulated energy in concert with the engine.

An example of a mechanical method that is used extensively involves a technique that improves both fuel consumption and torque through supercharging while maintaining an air-to-fuel ratio that achieves excellent fuel consumption. However, the former electrical method, that is, the method of using a large capacity rotary machine, capacitor, or power converter, is troublesome because the system increases in cost, weight, and complexity. Also, the latter mechanical method, that is, turbo supercharging, is complicated in that supercharging is insufficient at low engine speeds because the turbo system does not operate fast enough, whereas at high engine speeds, the turbo system operates too fast to the extent that there is a need to lower the exhaust pressure through bypassing.

The proposed techniques have problems related to cost, weight, and complexity of control with regard to the electro-motive assistance of the engine power. Additionally, there is the problem that the turbo system is insufficient or excessive depending upon an increase of engine combustion energy itself. Besides, only a small advantage has been achieved in improving fuel consumption and torque. Hence, to date, these techniques have not been in widespread use to the extent that they dominate the market.

SUMMARY OF THE INVENTION

An object of the present invention is to provide a simple, high-performance, comfortable, compound engine-power system for a vehicle while achieving improved fuel consumption and torque. The object also involves solving problems related to cost, weight, and complexity of control as to the electro-motive assistance, and aspects related to the turbo system such as insufficient or excessive supplies of pressure depending on an increase of combustion energy as described above. The invention achieves a simple, low-power consuming, optimal system arrangement of an engine, a supercharging rotary machine, and an engine motive power input/output rotary machine. Significant turbo effects are attained by eliminating dependency on a heavy battery or on complex control, which has been essential when charging and discharging power for electro-motive assistance to traditional motive power, while improving, in particular, the effect of turbo supercharging at low engine speeds and eliminating the need of complex mechanical control, such as pressure bypassing, at high engine speeds.

In order to solve the foregoing problems, the invention is directed to the following: improving total efficiency of the engine by adding exhaust energy, which is generally discarded, to an engine motive power axis, and increasing engine torque in a speed region where exhaust pressure is low by utilizing part of an engine motive power as a supercharging driving force. To be more specific, the invention adopts the arrangements as follows.

According to an arrangement of a first aspect of the invention, a compound engine dynamo-electric machine includes a first rotary machine linked to a turbo rotational axis and a second rotary machine linked to a crankshaft so that motive power is transmitted to and from the crankshaft so that the first rotary machine and the second rotary machine may exchange power. According to this arrangement, for example, the first exhaust turbo rotary machine is able to assist turbo supercharging by operating as a motor on power generated in the second rotary machine connected to the engine motive power axis. Also, the first turbo rotary machine is allowed to operate as a generator when exhaust energy is large, and makes the second rotary machine connected to the engine motive power axis operate electrically. Hence, it is possible to add exhaust energy to engine axis motive power.

Such exchange of power is performed directly between the first and second rotary machines, and no large capacity capacitor or power converter is necessary (these components may be provided for other purposes or detailed control). Hence, the foregoing problems can be eliminated.

According to an arrangement of a second aspect of the invention, the first and second rotary machines exchange AC power by linking ends of AC windings in respective armatures. According to this arrangement, AC power can be successfully transmitted and losses while being converted to DC or stored in a battery can be prevented, thereby enabling efficient association of the rotary machines. In other words, it is possible to avoid the conventional problem described above in which the system increases in weight when it is dependent on a battery, and in cost and complexity of control when the system is dependent on a forward-reverse power converter.

According to an arrangement of a third aspect of the invention, one of the first and second rotary machines is an inductor or a reluctance device and the other rotary machine is a synchronous machine. According to this arrangement, a degree of freedom is given to the number of rotations and rotational angle of a plurality of rotary machines to be linked in association. Hence, it is possible to avoid selecting or a power change or surge that is likely to occur in the respective rotary machines due to influence of the inertia of the rotary machines, electrical response, and a mechanical time constant of the engine linked thereto for being driven. In other words, a simple, inexpensive system arrangement can be achieved without the need to detect the states of the respective rotary machines and complex and accurate control based on the detection.

According to an arrangement of a fourth aspect of the invention, the first rotary machine operates electrically on power generated in the second rotary machine in a low engine speed region. According to this arrangement, supercharging takes place when torque is small at a low engine speed. Alternatively, in the type of arrangements also connected to the exhaust turbine, supercharging is reinforced with the addition of electro-motive power, and the output torque in the low engine speed region can thus be increased. According to this electro-motive assisting arrangement, load torque of the exhaust turbine at low engine speeds can be reduced or cancelled, or reduced to a negative pressure. Consequently, exhaust resistance is reduced, and combustion in the low speed region is thereby improved and so is power consumption. In other words, by shifting the first rotary machine to the electro-motive assisting operation in the low engine speed region, it is possible to increase torque through the turbo effect and to achieve improved fuel consumption.

According to an arrangement of a fifth aspect of the present invention, a supercharger in which an exhaust turbine and a rotary machine are connected to a supercharging turbine is further included, and the second rotary machine operates electrically on power generated in the first rotary machine in a high engine speed region. According to this arrangement, it is possible to add a significant increase in exhaust energy, and therefore torque, in the high engine speed region to the engine driving axis, and torque is thereby improved. Also, exhaust energy, which is conventionally discarded, is converted to an effective output for the engine. Hence, the efficiency is improved and so is fuel consumption. In other words, it is possible to improve torque and fuel consumption using regeneration of exhaust energy as the basic principle.

According to an arrangement of a sixth aspect of the invention, the first rotary machine limits a speed of a rotor thereof so as not to exceed a predetermined number of rotations by reducing a quantity of power generated in another rotary machine or by making the rotary machine operate electrically. According to this arrangement, it is possible to prevent the turbine from being damaged due to excessive rotations, and a simple, inexpensive supercharger can be realized. Also, since a pipe or control to release an exhaust pressure can be omitted, a light, simple, inexpensive system can be achieved. In other words, by applying an electrical load, not only can the safety of the turbo be ensured, but also the object of simplification can be attained.

According to an arrangement of a seventh aspect of the invention, the first or second rotary machine is provided with an AC-to-DC converter whose terminal is connected to a capacitor. According to this arrangement, when power is exchanged excessively between the linked rotary machines, excessive power can be stored and used for another load in the vehicle. Also, when power to be exchanged between the linked rotary machines becomes insufficient, the power can be compensated or supplemented.

In other words, by further linking the link systems in the respective rotary machines to outside power control means, association between the respective rotary machines can be extended in terms of time and function, which allows the respective rotary machines to be linked more closely. Hence, the problems to which the invention is addressed can be solved.

According to an arrangement of an eighth aspect of the invention, the second rotary machine is a Randell type multi-polar generator, which is driven and accelerated by a belt. According to this arrangement, the first rotary machine can be readily driven at ultra high-speeds which will improve the supercharging performance. Moreover, the foregoing problems can be solved at a low cost because there is no need to provide the second rotary machine. To be more specific, the turbo supercharger needs to operate at approximately 100,000 rpm in general, and for this reason, the electrical frequency of the rotary machine has to be set higher than that of a general industrial rotary machine. However, as the frequency becomes higher, losses, such as core losses, increase markedly. Hence, it is necessary to design the rotary machine with the frequency reduced as low as possible. Nevertheless, for example, even with a two-pole pair arrangement, which is the lowest pole number, a frequency of as high as 1.6 kHz is necessary at 100,000 rpm, which is 26 times higher than the general commercial frequency of 60 Hz.

In order to obtain power at such a high frequency, a conventional Randell type multi-polar generator is used, in particular, an alternator accelerated by three-fold by a belt, is most suitable. In other words, in the case of a general alternator with a 16-pole pair and a pulley ratio of 3, a frequency of 1.6 kHz can be obtained at an engine speed of 4,000 rpm. In the case of an alternator with 20 poles and a pulley ratio of 4, the turbo system can operate at 50,000 rpm at an engine speed of 1,200 rpm. Hence, the effect of supercharging, which generally starts to appear at approximately 30,000 rpm, can be exhibited in a satisfactory manner. In other words, by using a Randell type multi-polar generator as the second rotary machine, the first rotary machine can be readily driven at ultra high-speeds, which solves the conventional problems in cost and complexity. Hence, the problems to which the invention is addressed can be solved.

According to an arrangement of a ninth aspect of the invention, the second rotary machine is an AC starter furnished with a power-generating function and is driven to accelerate by a gear. According to this arrangement, the second rotary machine can attain a high acceleration ratio needed to electrically drive the supercharging first rotary machine, and the power-generating frequency can be thus raised to a quite high level, which allows the first rotary machine to be driven at high speeds. Also, since the frequency common in the first rotary machine and the second rotary machine can be raised, both can be downsized according to the general principle of the rotary machine. Hence, the forgoing problems in weight and cost can be solved. Also, the second rotary machine does not have to be provided additionally, and in this regard, the problems in cost and weight to which the invention is addressed can be solved.

According to an arrangement of a tenth aspect of the invention, the second rotary machine is an induction type high frequency generator employing a ring gear used to decelerate the starter as a rotor.

According to this arrangement employing a ring gear provided with many teeth as an inductor, the frequency of the second rotary machine can be readily increased, and because of being the induction type, the magnetic flux is not in alternation but in pulsation. Hence, the core losses are reduced drastically, which makes it possible to suppress an increase in losses even when the frequency is raised. In other words, since the frequency common in the first rotary machine and the second rotary machine can be raised, both can be downsized according to the general principle of the rotary machine. Hence, the foregoing problems in weight and cost can be solved. Also, the second rotary machine does not have to be additionally provided, and in this regard, the problems in cost and weight to which the invention is addressed can be solved.

According to an arrangement of an eleventh aspect of the invention, a third rotary machine is further included in parallel to the first and second rotary machines, and the third rotary machine exchanges power with the first and second rotary machines through an AC or DC link. According to this arrangement, a degree of freedom as to energy management for the entire engine can be increased, and so is the efficiency of the entire system, which solves the problems to which the invention is addressed.

According to an arrangement of a twelfth aspect of the invention, the first or second rotary machine is provided with a field adjusting means. According to this arrangement, it is possible to control the direction and magnitude of mutually exchanged power freely without depending only on the number of rotations of the respective rotary machines. In regard to an increase in torque, the field can be strengthened at low engine speeds, which makes it possible to raise the necessary torque further. In short, the foregoing object to which the invention is addressed can be achieved.

According to an arrangement of a thirteenth aspect of the invention, an armature of the third rotary machine is linked through switch means, and controls an input into and an output from the first and second rotary machines at a motive power control command. According to this arrangement, for example, when one of the rotary machines becomes unable to consume generated power transiently while the other rotary machine does not need electro-motive power, it is possible to remove the influence of the former to the latter instantaneously by shutting down the armature system. In other words, a degree of freedom is increased as to the ability to avoid the mutual interference when the rotary machines are linked, which makes it possible to achieve the optimal system arrangement.

According to an arrangement of a fourteenth aspect of the invention, the dynamo-electric machine further includes a means for detecting input and output states in the respective rotary machines, a means for detecting an abnormality, potentially using a battery, and a means for cutting the link. According to this arrangement, it is possible to identify the state of the link and thereby to avoid an abnormality. Hence, it is no longer necessary to increase the reliability of the respective machines and the mutual link, which can reduce the cost and allows the characteristic to be exhibited to the fullest extent possible.

According to an arrangement of a fifteenth aspect of the invention, the first rotary machine is placed between the exhaust turbine and the supercharging turbine. According to this arrangement, no additional rotary machine is necessary, and an inexpensive, compact arrangement can be achieved. Also, it is possible to collect generated power by receiving motive power from the exhaust turbine, and the collected power can be used in re-circulating motive power or as electrical energy for any other electrical equipment mounted on the vehicle. In other words, energy of the engine, and further, that of the vehicle system can be managed efficiently, and the improvement of fuel consumption addressed by the invention can be attained.

According to an arrangement of a sixteenth aspect of the invention, a one-way clutch mechanism that allows the first rotary machine and the exhaust turbine to drive the supercharging turbine, and allows the exhaust turbine to drive the first rotary machine while inhibiting the first rotary machine to drive the exhaust turbine is further included.

According to this arrangement, supercharging that needs large motive power of 1 to 3 kW is assisted by exhaust motive power and electro-motive power. Hence, the scavenging burden and the power generation burden assigned to the other rotary machine can be reduced, which in turn brings favorable effects pertaining to fuel consumption and torque.

According to an arrangement of a seventeenth aspect of the invention, at least one of the first rotary machine and another rotary machine linked thereto is of a field current exciting type and a rotor thereof generates a rotating magnetic field that is different from actual rotations to enable variable control on a power-generating frequency of the armature or an electro-motive speed of the rotor. According to this arrangement, even when the actual engine speed is low, the power-generating frequency of the second rotary machine can be raised. Hence, a higher voltage can be given to the second rotary machine at low engine speeds, while the driving number of rotations of the first rotary machine can be increased because of the raised frequency. On the other hand, when the engine speed is extremely high, the power-generating frequency of the second rotary machine can be lowered, which in turn makes it possible to limit the excessive number of rotations while maintaining the turbo driving force. In other words, because a degree of freedom can be given to the power-generating frequency, it is possible to control generation and exchange of power without depending on the engine speed.

According to an arrangement of an eighteenth aspect of the invention, the second rotary machine is provided with a three-phase armature winding and a multi-phase AC field winding. Because of this, the number of rotations of the first rotary machine is increased at least relatively when the engine speed is low by raising the power-generating frequency through acceleration of the rotating magnetic field of the second rotary machine than the speed of the rotor when the engine speed is low or conversely by lowering the power-generating frequency through deceleration of the rotating magnetic field of the second rotary machine than the speed of the rotor when the engine speed is high.

According to this arrangement, the first or second rotary machine, which is used under the severe environments at higher oscillations or number of rotations, can be of a brushless structure. Hence, not only can the reliability be increased, but also the rotary machines can be accelerated and downsized while increasing output to the fullest extent possible.

According to an arrangement of a nineteenth aspect of the invention, the first rotary machine is linked to another rotary machine through an AC medium having a second frequency higher than a frequency of a voltage on the armature of the first rotary machine. According to this arrangement, the wiring system needed for a link of large power can be designed in a simple manner. In other words, the transformer can be downsized by raising the frequency. Hence, a voltage of the link, that is, the power supplying system, can be readily raised or lowered. This enables a thin, light, simple wire while raising a voltage, and so the object of the invention can be attained.

According to an arrangement of a twentieth aspect of the invention, the first rotary machine is linked to another rotary machine through DC medium.

According to this arrangement, the number of wires needed for the link can be reduced. For example, in the case of three-phase AC, three or four wires are necessary. However, in the case of a DC link, only one wire is necessary apart from a common ground, which can simplify the system arrangement.

According to an arrangement of a twenty-first aspect of the invention, ineffective power adjusting means is interposed when linking the first rotary machine to another rotary machine to control a delay in an operation time, and buffering and acceleration of an operation. According to this arrangement, power to be rendered ineffective due to the inductance of the rotary machine can be adjusted, and therefore, the output from the rotary machine can be improved. To be more specific, it is possible to control a voltage-to-current relationship, that is, a power factor, and a relation between the polar angle and a voltage phase angle, that is, an internal phase difference angle. This makes it possible to improve the efficiency and the output potential, and thus the object of the invention can be attained at a higher level.

According to an arrangement of a twenty-second aspect of the invention, the second rotary machine does not transmit power to the engine crankshaft, but to an axel shaft or a transmission axis. According to this arrangement, since power regenerated in the first rotary machine from exhaust energy can be directly utilized as running motive power, the regeneration efficiency can be improved.

According to an arrangement of a twenty-third aspect of the invention, the second rotary machine is a braking generator also serving as a running motive power assisting motor. According to this arrangement, no braking power-generating energy is lost due to an engine braking loss, and the regeneration efficiency can thereby be improved.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

First Embodiment

The following description, with reference to FIGS. 1 through 5, depicts an arrangement of a first embodiment of the invention as applied to a vehicular engine. The following description of the preferred embodiments is merely exemplary in nature and is in no way intended to limit the invention, its application, or uses.

Figure 1:
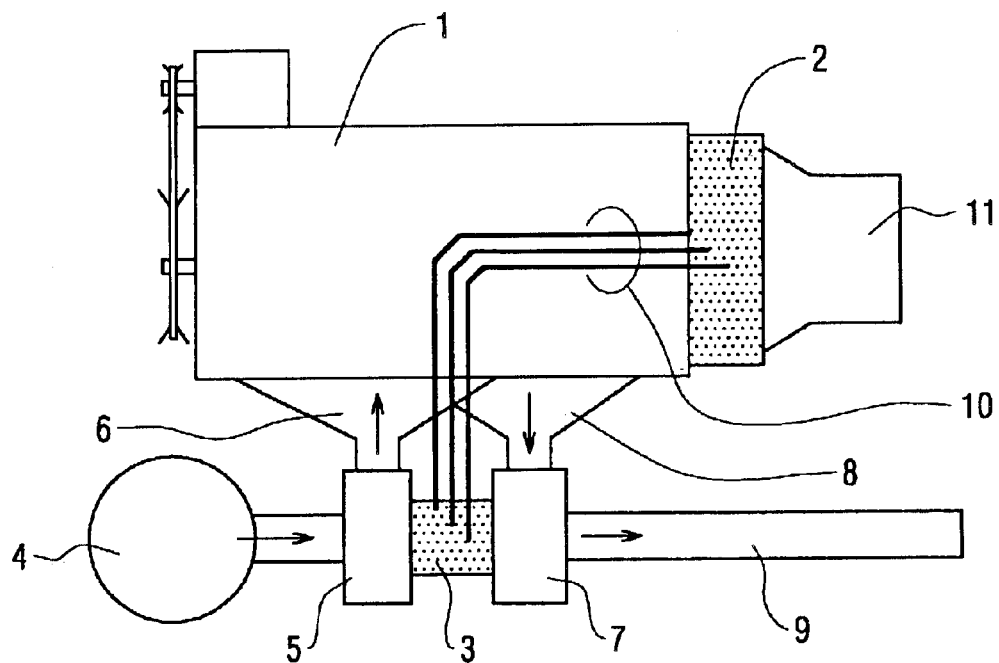
FIG. 1 is an explanatory view according to a first embodiment of the present invention.
Figure 3:
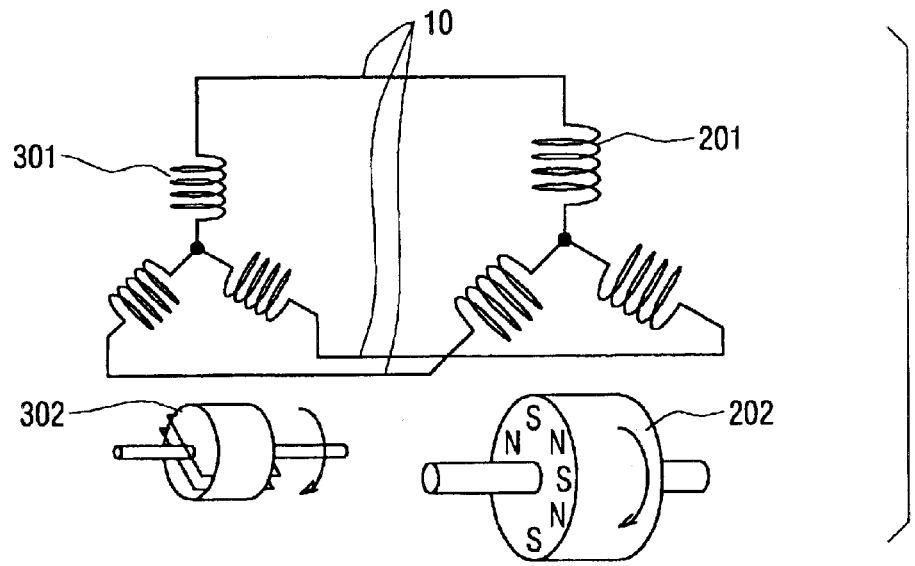
FIG. 3 is an electric circuit diagram according to the first embodiment of the present invention.

Referring to FIG. 1, a rotary machine 2 directly linked to an unillustrated crankshaft is mounted to a side surface of a multi-cylinder engine main body 1 in a space between the main body 1 and a transmission 11. The rotary machine 2 is a hybrid-polar high frequency generator motor provided with N poles and S poles formed alternately on the outer circumference of a rotor 202 by placing fifty (50) magnetic inductors with a certain space in between and then providing a magnet in each space as shown in FIG. 3. Also, the rotary machine 2 is a brushless structure provided with a field winding (not shown) placed at a stationary side and an armature winding 201 accommodated in a stator. The armature winding 201 has three phases and the AC terminal thereof is exposed from the housing of the generator. The rotor 202 is driven by the engine 1.

A rotary machine 3 includes a cage-type rotor 302 composed of a laminated iron core and an aluminum body surrounding the iron core, and a two-pole stator provided with a three-phase winding 301 whose terminal is exposed from the housing of the rotary machine 3.

Figure 2:
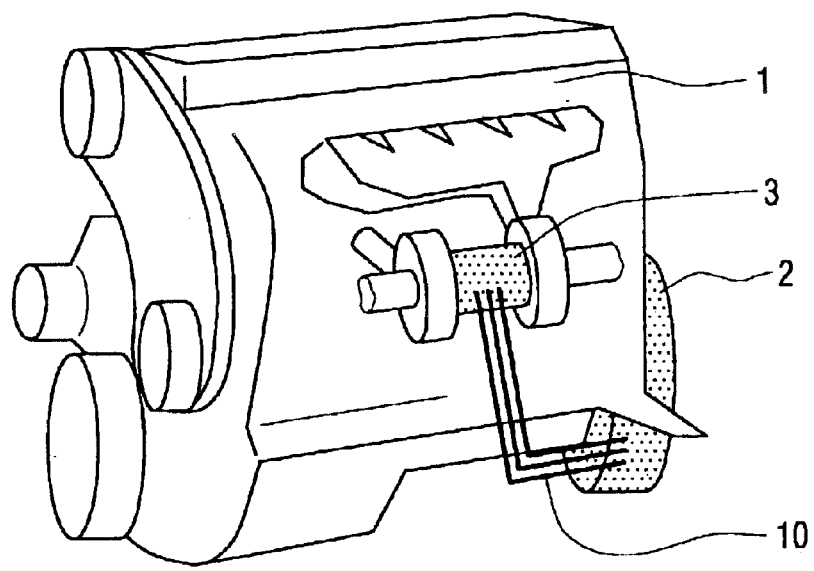
FIG. 2 is an explanatory exterior view according to the first embodiment of the present invention.

The rotary machine 3 and the rotary machine 2 are placed in the engine main body 1 as shown in FIGS. 1 and 2 and the wiring is installed through link means 10. The link means 10 connects the armature winding 201 and the three-phase winding 301.

The rotary machine 3 is placed between a supercharging turbine 5 and an exhaust turbine 7. The intake turbine 5 is a turbine that is placed between an intake filter 4 and an engine intake pipe 6 to raise an intake air pressure. Also, the exhaust turbine 7 is a reaction turbine that is placed between an engine scavenging ports collecting portion 8 and an exhaust pipe 9 to convert kinetic energy of an exhaust gas into rotational energy. The rotor of the rotary machine 3 is fit into the axes of the intake turbine 5 and the exhaust turbine 7, and these three components are formed as one unit.

An operation of the first embodiment will now be explained with reference to FIGS. 4 through 5.

(1) When engine speed is low, the number of rotations of the rotary machine 3 is not readily increased partly because the exhaust gas pressure is low and therefore the driving force derived from the exhaust pressure is small and partly because the rotary machine 3 has inertia. However, by strengthening the fields of the rotary machine 2, that is, the high frequency generator motor, the generated power flows into the rotary machine 3, and the rotary machine 3 increases the number of rotations through an electro-motive operation. To be more specific with regard to this phenomenon, the specific engine speed is approximately 1,200 rpm, which is slightly higher than the speed at idling, and the power-generating frequency is 1 kHz. Hence, the rotating magnetic field generated by the stator of the rotary machine 3 reaches 60,000 rpm according to the pole ratio, which is sufficiently higher than 30,000 rpm, that is, the speed at which the turbo effect generally begins, and the supercharging effect can thus be exhibited.

(2) When engine speed is high, the turbo speed increases drastically as the pressure of the exhaust gas increases, and the speed of the rotary machine 3 becomes higher than the supplied frequency from the rotary machine 2. Hence, the rotary machine 3 causes negative sliding in the induction motor and thereby begins to operate as an induction generator. Consequently, the power begins to flow into the rotary machine 2, whereupon the rotary machine 2 starts to assist the engine motive power by operating as a motor.

Figure 4:
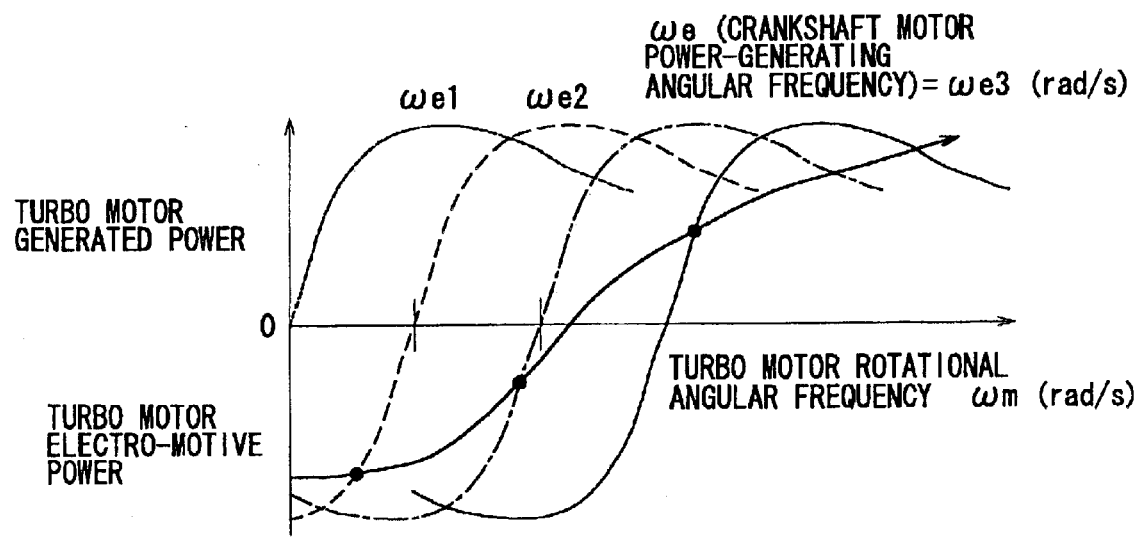
FIG. 4 is an explanatory view of an operation of a turbo rotary machine according to the first embodiment.

(3) FIG. 4 is a view depicting the operation in terms of a change in the engine speed, that is, in the number of rotations of the rotary machine 2, a change in the number of turbo rotations, that is, in the number of rotations of the rotary machine 3, and exchange of the power and motive power as described above. In other words, the turbo rotary machine 3 automatically switches its operation from one as a motor to one as a generator along with a change in engine speed from low to high so as to plot the respective points on a plurality of curves shown in the drawing.

Figure 5:
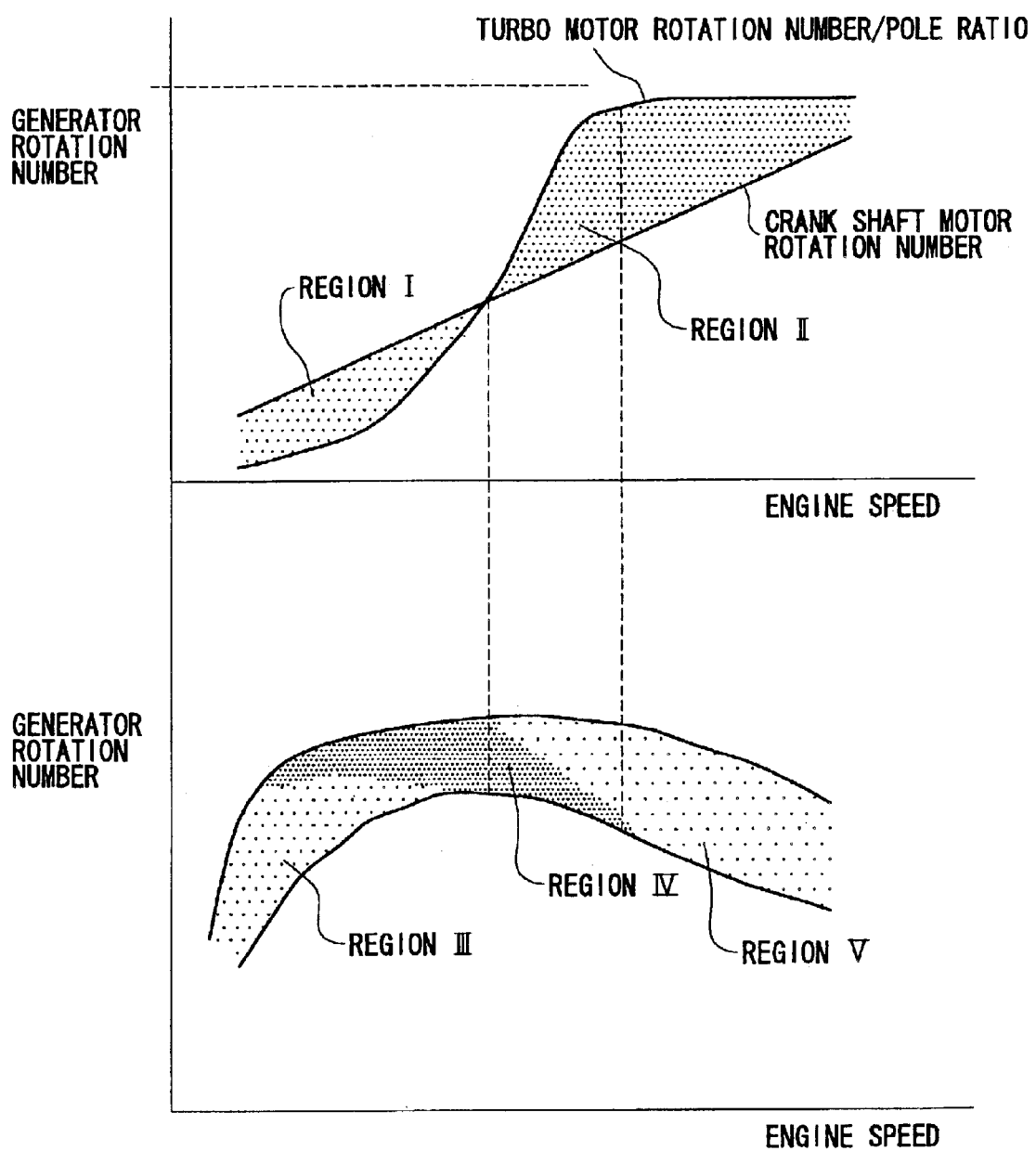
FIG. 5 is a graph showing engine power improving advantages according to the first embodiment.

FIG. 5 is a view explaining relationships of the number of rotations, and power generation and electro-motive operations of the rotary machines 3 and 2 with respect to the engine speeds, and advantages in improving total torque performance of the engine system achieved by these relations. To be more specific, region I indicates supercharging electro-motive assistance by the turbo motor, and region II indicates electro-motive assistance of the crankshaft by the crankshaft motor. Region III indicates that mechanical output from the engine system is increased due to electro-motive assistance through turbo supercharging, and region IV indicates that mechanical output from the engine system is increased due to mechanical assistance through supercharging by the exhaust gas turbine. Also, region V indicates that mechanical output from the engine system is increased due to electro-motive assistance of the crankshaft by the power generated in the turbo motor. Hence, advantages attained are that the engine torque is increased through the turbo effect in the low speed and medium speed regions, and that the engine output is improved due to the motive power assistance by collecting exhaust energy and feeding back the exhaust energy to the motive power axis in the high speed region.

As has been described, according to the present embodiment, the engine performance improving advantages can be achieved by merely connecting the respective rotary machines which makes it possible to omit conventional, expensive, complex controls that are dependent on a battery or an inverter. It is thus possible to drastically improve torque and fuel consumption.

Other Embodiments

Figure 6:
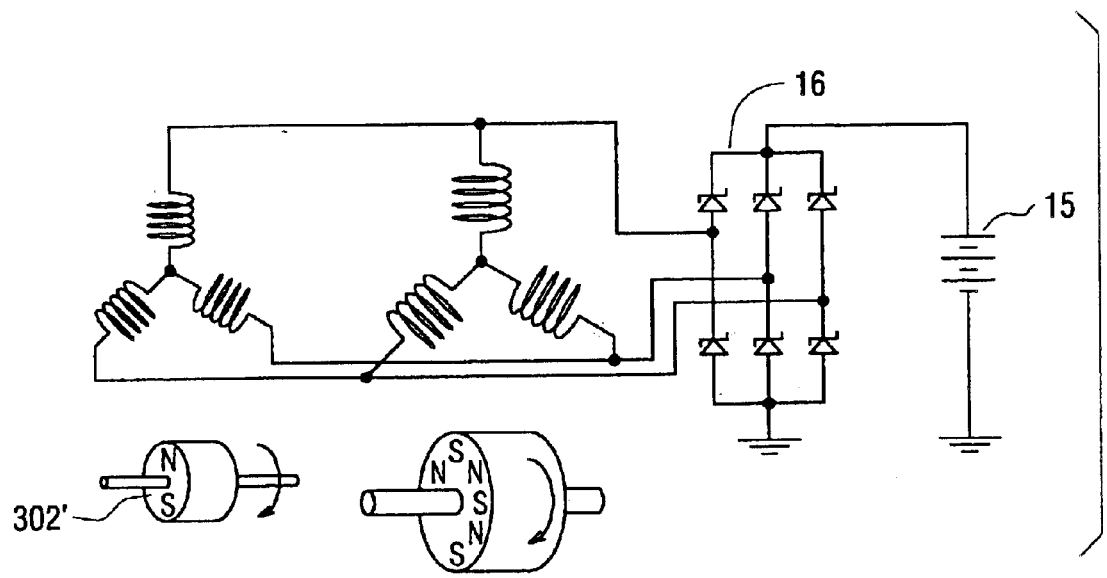
FIG. 6 is a schematic of an arrangement according to a second embodiment.

In the first embodiment above, an induction rotary electric machine is adopted as the first rotary machine, e.g. rotary machine 3. However, it may be a synchronous machine of a permanent-magnet type as with a second embodiment shown in FIG. 6. In this case, the rotor 302' is magnetized by a permanent magnet mounted thereon. Alternatively, it may simply be a salient or non-salient reluctance device. Furthermore, it is possible to additionally provide a rectifier 16 or a battery 15 to the link system, e.g. the link means in FIG. 3, so as to assist in an inter-exchange of power among a plurality of rotary machines or draw power therefrom. In short, control with a higher degree of freedom can be achieved.

Figure 7:
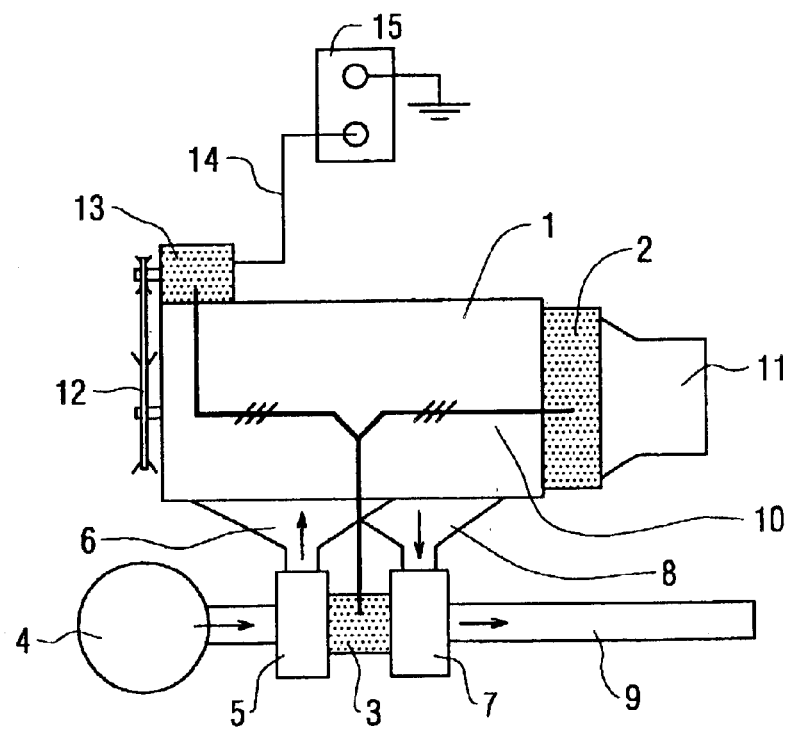
FIG. 7 is an explanatory view according to a third embodiment.

In the embodiments above, the rotary machine directly linked to the crankshaft is linked to the first turbo rotary machine to operate in a concerted manner. However, as shown in FIG. 7, a Lundel type high frequency generator 13 driven by a belt 12 may be additionally operated in a concerted manner. In this embodiment, the link means 10 connects among the rotary machines 2, 3 and the generator 13. The battery 15 is charged via the generator 13 and a wire 14.

Figure 8:
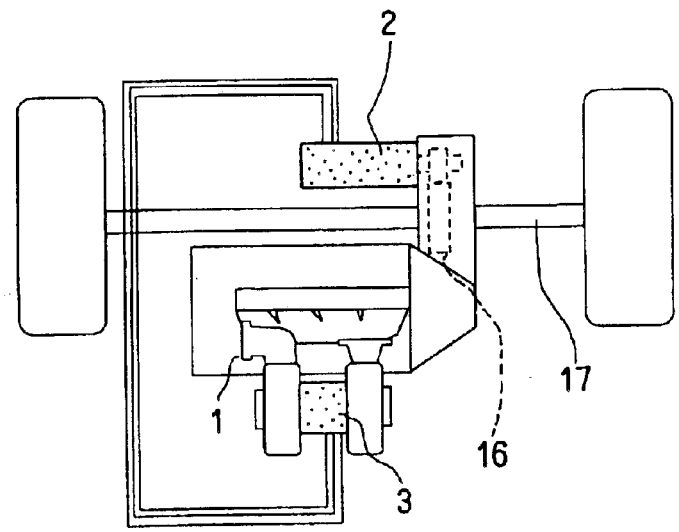
FIG. 8 is an explanatory view according to a fourth embodiment.
Figure 9:
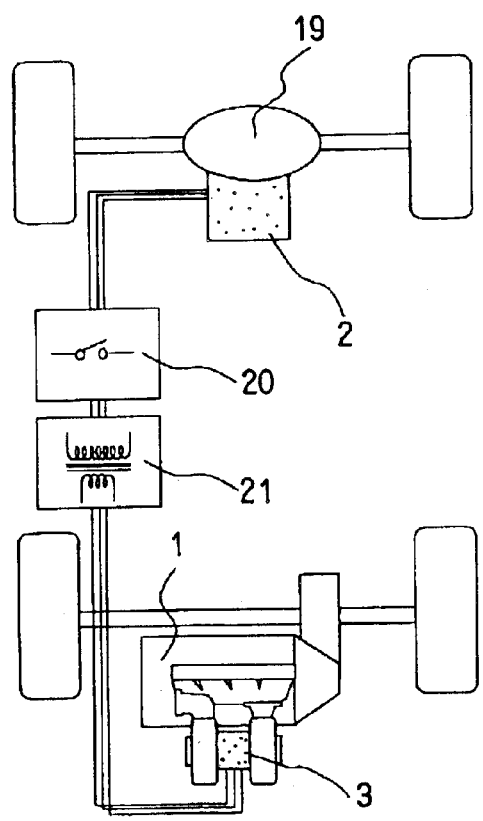
FIG. 9 is an explanatory view according to a fifth embodiment.

Also, in the embodiments above, the rotary machine directly linked to the crankshaft or the belt-driven Randell type high frequency generator is operated in concert with the first turbo rotary machine. However, as with a fourth embodiment shown in FIG. 8, a generator-motor 2 serving as the second rotary machine coupled with a gear 16 on an accelerating axis 17 of a CVT (non-stage or non-stepping transmission) linked to an axel shaft may be operated in concert with the first turbo rotary machine in association with AC power. Alternatively, as with a fifth embodiment shown in FIG. 9, a generator motor 2 used to drive the rear wheels and for regeneration provided to a differential gear portion 19 to which the axel shaft is linked may be operated in concert with the first turbo rotary machine. In this embodiment, the AC power associating portion may be provided with a switch device 20 and a transformer 21. When arranged in this manner, the controllability can be enhanced further and power losses along the wires can be reduced.

Also, the power transmission means may be a chain, a gear, or a direct connection. Those types that do not transmit power directly to the engine axis lose little energy due to losses in the engine 1 at braking, and lose no electro-motive power due to engine friction when the engine is under a light load. Hence, a more efficient operation can be achieved.

In other words, the foregoing components can be operated in a concerted manner concurrently or by switching between one another, or form a network on the same AC link, or linked in a DC fashion either partially or entirely. In the case of DC, there is the advantage of simpler wiring; however, there is a disadvantage that a converter, such as a rectifier, is necessary. In the case of AC, although the number of wires is increased, there is the advantage that no converter, such as a rectifier, is necessary. Hence, AC and DC can be used in a selective fashion depending on the vehicle, engine characteristics, engine or vehicle purposes, etc.

The description of the embodiments of the invention is merely exemplary in nature and, thus, variations that do not depart from the gist of the invention are intended to be within the scope of the invention. Such variations are not to be regarded as a departure from the spirit and scope of the invention.

What is claimed is:

1. A compound engine dynamo-electric machine, comprising:
   a first motor generator in a vehicle linked to a turbo rotational axis; and
   a second motor generator linked to a crankshaft of the vehicle so that motive power is transmitted to and from the crankshaft,
   wherein the first motor generator and the second motor generator are electrically combined to increase a total generated motive power, including engine power, through exchange of power between said first and second motor generators.

2. The compound engine dynamo-electric machine according to claim 1, wherein said first and second motor generators exchange AC power by linking ends of AC windings in respective armatures directly or indirectly through an AC converter represented by a transformer.

3. The compound engine dynamo-electric machine according to claim 1, wherein one of said first and second motor generators is an inductor or a reluctance device and the other motor generator is a synchronous machine.

4. The compound engine dynamo-electric machine according to claim 1, wherein said first motor generator operates electrically on power generated in said second motor generator in a low engine speed region.

5. The compound engine dynamo-electric machine according to claim 1, further comprising:
a supercharger in which an exhaust turbine and the first motor generator are connected to a supercharging turbine,
wherein said second motor generator operates electrically on power generated in said first motor generator in a high engine speed region.

6. The compound engine dynamo-electric machine according to claim 1, wherein said first motor generator limits a speed of a rotor thereof so as not to exceed a predetermined number of rotations by reducing a quantity of power generated in another motor generator or by making said motor generator operate electrically.

7. The compound engine dynamo-electric machine according to claim 1, wherein said first or second motor generator is provided with an AC-to-DC converter whose terminal is connected to a capacitor.

8. The compound engine dynamo-electric machine according to claim 1, wherein said second motor generator is a Lundel type multi-polar generator, which is accelerated by a belt.

9. The compound engine dynamo-electric machine according to claim 1, wherein said second motor generator is an AC starter furnished with a power-generating function and accelerated by a gear.

10. The compound engine dynamo-electric machine according to claim 1, wherein said second motor generator is an induction type high frequency generator employing a ring gear used to decelerate the starter as a rotor.

11. The compound engine dynamo-electric machine according to claim 1, further comprising:
a rotary electric machine in parallel with said first and second motor generators,
wherein said rotary electric machine exchanges power with said first and second motor generators through an AC or DC link.

12. The compound engine dynamo-electric machine according to claim 1, wherein said first or second motor generator is provided with a field adjusting means to be able to control mutual power exchange regardless of engine speed.

13. The compound engine dynamo-electric machine according to claim 11, wherein an armature of said rotary electric machine is linked through a switch means and controls an input into and an output from said first and second motor generators at a motive power control command.

14. The compound engine dynamo-electric machine according to claim 13, further comprising:
means for detecting input and output states in said respective motor generators and said rotary electric machine;
means for detecting an abnormality;
means for cutting the link; and
a battery.

15. The compound engine dynamo-electric machine according to claim 5, wherein said first motor generator is placed between said exhaust turbine and said supercharging turbine.

16. The compound engine dynamo-electric machine according to claim 5, further comprising:
a one-way clutch mechanism that allows the first motor generator and said exhaust turbine to drive said supercharging turbine, and allows said exhaust turbine to drive said first motor generator while inhibiting said first motor generator from driving said exhaust turbine.

17. The compound engine dynamo-electric machine according to claim 11, wherein:
at least one of said first motor generator and at least one of the second motor generator and the rotary electric machine linked thereto is of a field current exciting type; and
a rotor thereof generates a rotating magnetic field different from actual rotations to enable variable control on a power-generating frequency of an armature or an electro-motive speed of said rotor.

18. The compound engine dynamo-electric machine according to claim 17, wherein:
said second motor generator is provided with a three-phase armature winding and a multi-phase AC field winding, so that the number of rotations of said first motor generator is increased at least relatively when an engine speed is low by raising the power-generating frequency through acceleration of the rotating magnetic field of said second motor generator than the speed of said rotor when the engine speed is low or conversely by lowering the power-generating frequency through deceleration of the rotating magnetic field of said second motor generator than the speed of said rotor when the engine speed is high.

19. The compound engine dynamo-electric machine according to claim 1, wherein said first motor generator is linked to said second motor generator through a medium of an alternating current having a second frequency higher than a frequency of a voltage on an armature of said first motor generator.

20. The compound engine dynamo-electric machine according to claim 1, wherein said first motor generator is linked to said second motor generator through a medium of a direct current.

21. The compound engine dynamo-electric machine according to claim 1, further comprising:
ineffective power adjusting means, interposed when linking said first motor generator to at least one of the second motor generator and a rotary electric machine, for controlling a delay in an operation time, and buffering an accelerating an operation.

22. A compound engine dynamo-electric machine, comprising:
a first motor generator in a vehicle linked to a turbo rotational axis; and
a second motor generator in the vehicle linked to a transmission axis or an axel shaft provided through an engine and a clutch in the vehicle such that motive power is capable of transmission therefrom and thereto,
wherein total generated motive power, including engine power, is increased through exchanging power between said first and second motor generators.

23. The compound engine dynamo-electric machine according to claim 22, wherein said second motor generator is a generator motor that generates vehicle braking regenerative energy and assists running motive power or traction control of a vehicle through a power-generating operation utilizing turbo generation power directly or turbo generation power stored in a capacitor.

* * * * *